United States Patent [19]
Didelot et al.

[11] Patent Number: 5,154,117
[45] Date of Patent: Oct. 13, 1992

[54] DEVICE FOR THE ASSEMBLY OF LAMINATED GLAZING BY PRESSING

[75] Inventors: Claude M. Didelot; Francis M. Triffaux, both of Thourotte; Gilles M. Wattiau, Compiegne, all of France

[73] Assignee: Saint-Gobain Vitrage International, Courbevoie, France

[21] Appl. No.: 641,892

[22] Filed: Jan. 16, 1991

[30] Foreign Application Priority Data

Jan. 16, 1990 [FR] France ............................. 90 00421

[51] Int. Cl.⁵ .............................................. B30B 3/04
[52] U.S. Cl. .................................. 100/155G; 100/156; 100/160; 100/168; 100/170; 100/171; 156/582
[58] Field of Search ........... 100/155 R, 155 G, 163 R, 100/156, 168–171, 172, 176, 160; 156/99, 102, 103, 582, 555, 358

[56] References Cited

U.S. PATENT DOCUMENTS

| | | | |
|---|---|---|---|
| 1,576,266 | 3/1926 | Biggert, Jr. ...................... | 100/168 X |
| 1,897,862 | 2/1933 | Randall ........................... | 100/168 X |
| 2,340,933 | 2/1944 | Chilton ........................... | 100/155 G X |
| 2,525,980 | 10/1950 | Walters ........................... | 100/155 G X |
| 2,628,177 | 2/1953 | Boicey et al. .................... | 100/155 G X |
| 3,048,214 | 8/1962 | Madge et al. .................... | 100/155 G X |
| 3,054,344 | 9/1962 | Boicey et al. .................... | 100/155 G X |
| 3,089,408 | 5/1963 | Swindler ......................... | 100/155 G X |
| 3,266,414 | 8/1966 | Wahlstrom et al. ............... | 100/163 R |
| 3,500,524 | 3/1970 | Jagminas .......................... | 100/169 X |
| 3,669,808 | 6/1972 | Klotzbach et al. ................ | 100/155 G X |
| 4,327,634 | 5/1982 | Colmon et al. ................... | 100/155 G |
| 4,701,240 | 10/1987 | Kraemer et al. .................. | 100/155 G X |
| 4,946,523 | 8/1990 | Meussner ......................... | 156/103 X |
| 4,988,398 | 1/1991 | Pereman et al. .................. | 100/155 G X |

FOREIGN PATENT DOCUMENTS

| | | |
|---|---|---|
| 0015209 | 9/1980 | European Pat. Off. . |
| 0189345 | 7/1986 | European Pat. Off. . |
| 0290344 | 11/1988 | European Pat. Off. . |
| 0316224 | 5/1989 | European Pat. Off. . |
| 0351288 | 1/1990 | European Pat. Off. . |
| 2033819 | 1/1972 | Fed. Rep. of Germany . |
| 2053104 | 6/1975 | France . |

Primary Examiner—Harvey G. Hornsby
Assistant Examiner—Stephen F. Gerrity
Attorney, Agent, or Firm—Oblon, Spivak, McClelland, Maier & Neustadt

[57] ABSTRACT

A device for the assembly of a laminated glazing (8) by pressing includes at least one set of pressing rollers (3, 5) mounted on a flexible beam (9, 25) whose curvature can be modified and adjusted to a desired profile.

15 Claims, 5 Drawing Sheets

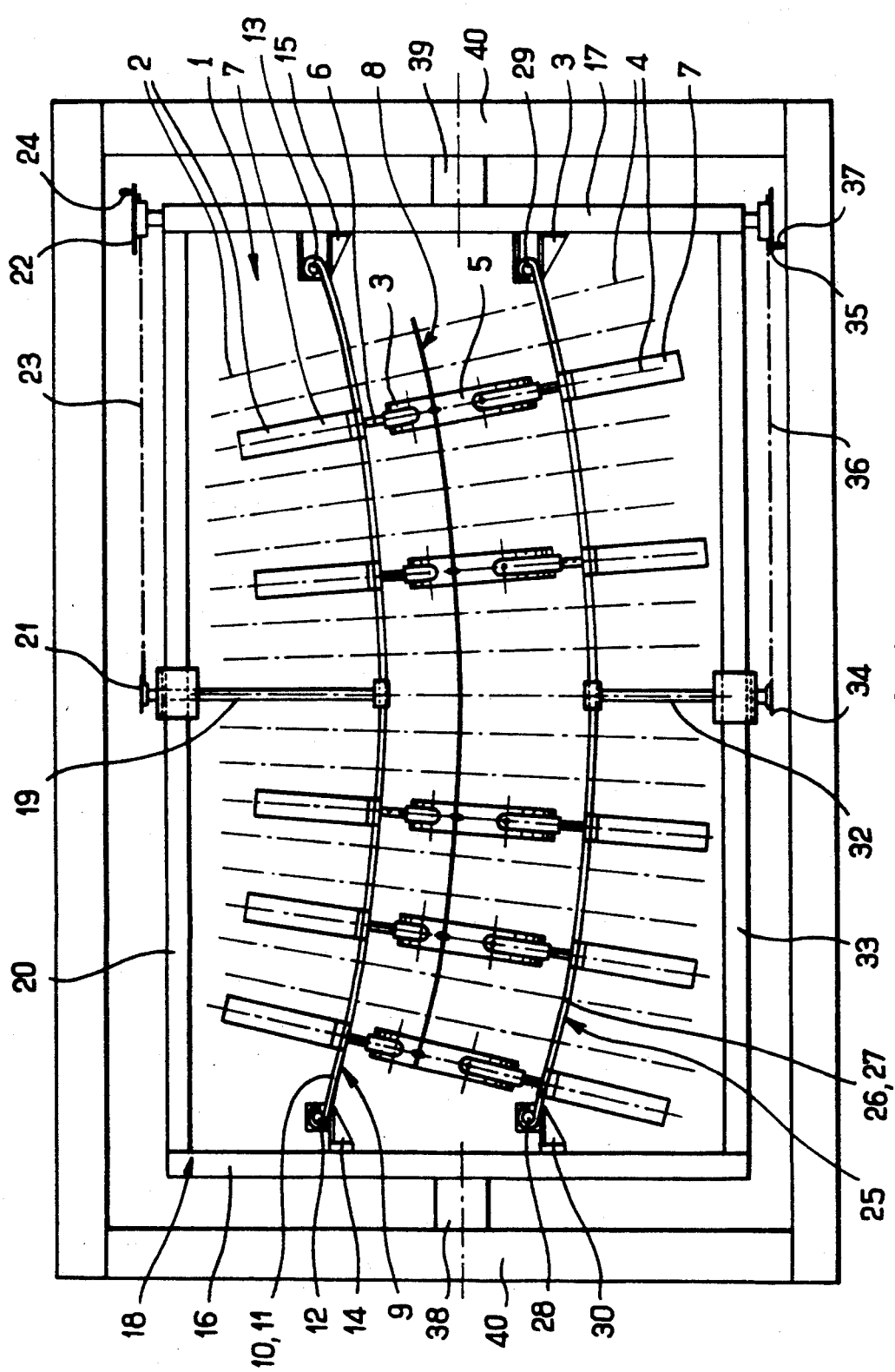
FIG_1

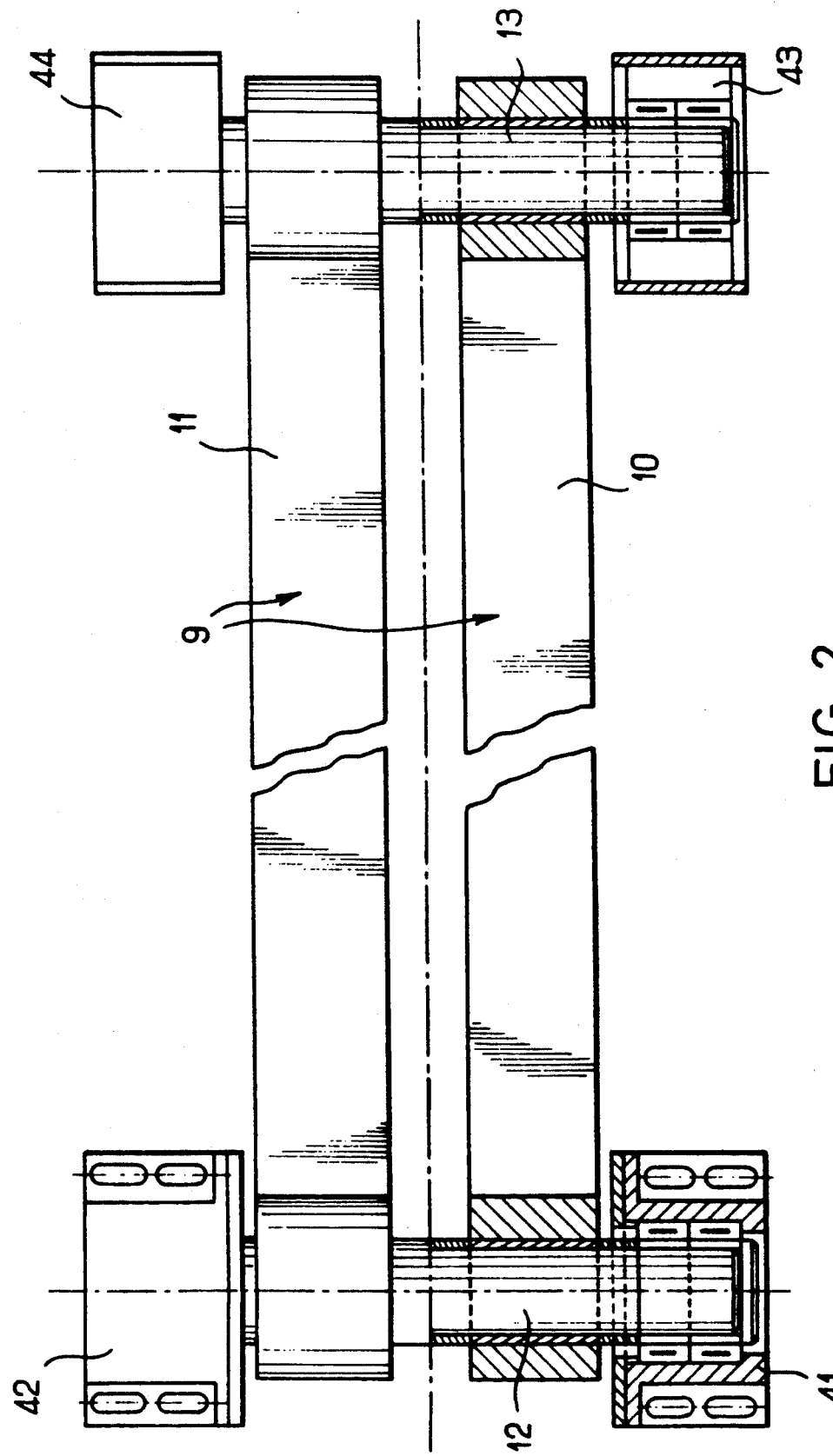
FIG._2

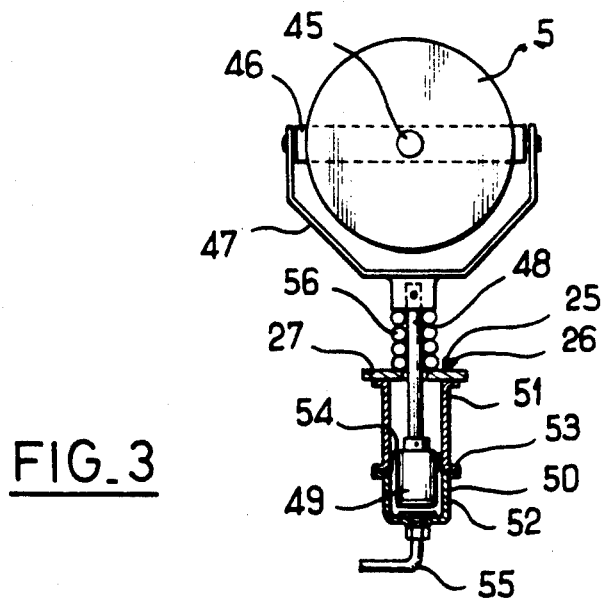
FIG_3
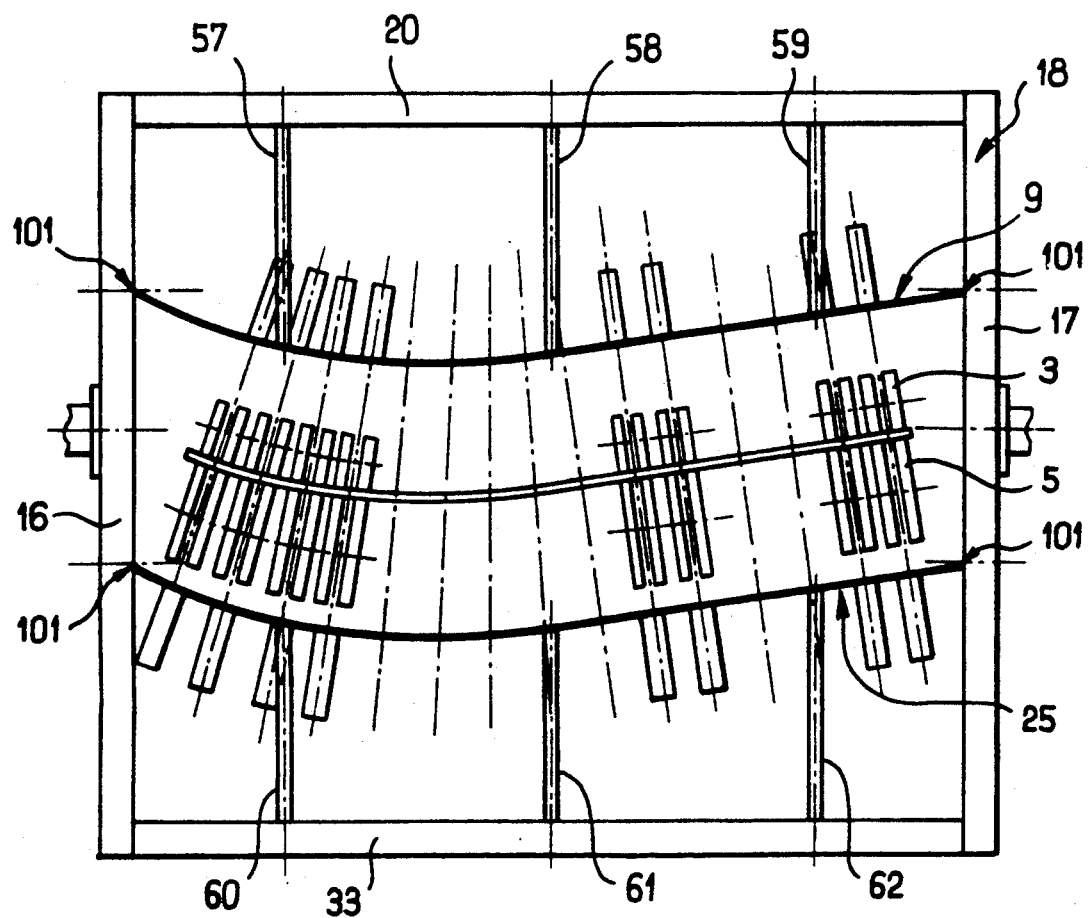
FIG_4 ated rigid support and a flexible plastic sheet

DEVICE FOR THE ASSEMBLY OF LAMINATED GLAZING BY PRESSING

BACKGROUND OF THE INVENTION

1. Field of the Invention

This invention relates to the production of laminated glazings and in particular to a device for the assembly of the constituent elements of a laminated glazing by pressing, in particular by calendaring, i.e., by passing the stack of said constituent elements (designated as glazing in the following description) between upper pressing means and lower pressing means.

2. Description of the Related Art

Known calendaring devices, described for example in French patent publication 2,053,104, are generally equipped with two series of pressing rolls or rollers: a series of lower rollers placed beside one another, their positions being independently adjustable to obtain a curvature corresponding to the desired crosswise curvature, which is generally the mean curvature of the glazing; and a series of upper rollers placed approximately in the same way. In known devices, the two series of rollers are each mounted on a crosswise beam belonging to a frame able to pivot around a horizontal axis, the whole constituting a mobile unit, so that the rollers remain approximately perpendicular to the glazing during the entire assembly operation. The adjustment of the original position of the pressing rollers can be performed by means of their system of mounting on the crosswise beam. This adjustment is delicate and time consuming because these devices are equipped with a large number of pressing rollers, generally between 30 and 40. These rollers must be adjusted in height and possibly in inclination, individually or in pairs, in relation to one another. The original position of the pressing rollers is generally adjusted according to the mean crosswise curvature of the glazing.

During the passage of the glazing between the rollers, the position of these rollers can vary to follow variations, when they are not very significant, of the crosswise curvature of the glazing, via their system of mounting by elastic or pneumatic means on the beam to which they are attached. A mounting device using pneumatic means and obtaining a great flexibility for the rollers is described in European patent publication 0,189,345. In this device, called a "floating" device, the compression chambers of the cylinders of the upper rollers and those of the cylinders of the lower rollers are in communication, so that the pneumatic pressure exerted on a pressure roller is equal to that exerted on a counter pressure roller.

These devices are generally suitable for the assembly of glazings exhibiting a slightly pronounced and regular crosswise bending and when this crosswise bending of the glazing is approximately the same over the entire length of the glazing. But for glazings with more complex shapes, particularly for glazings exhibiting a very deep bending in the crosswise direction and/or an irregular bending over the length of the glazing, these known devices are not always satisfactory because they are not flexible enough to be able to follow all the large variations in curvature of the glazing. If their pressure is too small, an insufficient or not very homogeneous adhesion of the constituent elements of the glazing results or, conversely, if their pressure is too high, breaking of the glazing results.

In addition, when going from one type of glazing to another type of glazing of different mean crosswise curvature, it is generally necessary to modify the original position of the rollers and therefore to redo the adjustment.

SUMMARY OF THE INVENTION

It is an object of the present invention to prevent the above drawbacks.

The invention proposes a device for assembly of symmetrical or asymmetrical laminated glazings by pressing, the device being able to operate both on glazings having a slightly pronounced and regular double bending (i.e., a glazing exhibiting both a longitudinal curvature and a crosswise curvature) and on glazings having complex shapes having very pronounced and/or irregular bendings. Symmetrical laminated glazings are laminated glazings whose two faces consist of rigid sheets such as glass sheets. Asymmetrical laminated glazings are laminated glazings formed by a monolithic or laminated rigid support and a flexible plastic sheet having desired properties, for example the asymmetrical glazings described in French patent publications 2,398,606 and European patent publications 0,132,198 and 0,131,523.

The invention also proposes a device making possible a quick adjustment of the curvature or original position of the rollers.

The device according to the invention is a pressing device that comprises at least one set of pressing rollers extending crosswise to the glazing, this set being mounted on a flexible beam whose curvature is adjusted to a desired profile.

According to an embodiment of the device according to the invention, the flexible beam is connected to a horizontal crosspiece via adjustment means for obtaining the desired curvature, e.g., bolts, racks, cr other mechanical systems, or by one or more pneumatic cylinders.

Various adjustments in the curvature can be envisaged. A single adjustment can be provided that corresponds to the original curvature and to the crosswise mean curvature of the glazing to be calendared. An adjustment of the original curvature can also be provided, i.e. that before passage of the glazing. Variations of this adjustment, therefore of the curvature, as a function of the variations in crosswise curvature of the glazing, can be applied as it advances in the device.

The adjustment of the original curvature of the flexible beam is performed as a function of the desired glazing, either manually or automatically.

According to an embodiment of the device according to the invention, the adjustment of the curvature of the flexible beam is controlled by a computer having the shape of the glazing in memory, or in a variant, by a computer connected to sensors measuring the bending depth of the glazing. The computer then operates on the adjustment means to affect the desired variations in curvature during the passage of the glazing between the pressing means.

In an embodiment of the device, the flexible beam is made of at least one spring blade of suitable dimensions.

According to an advantageous embodiment of the device, the flexible beam is made of two spring blades of suitable dimensions, placed parallel and spaced from one another to make possible the passage between them of the mounting means of the pressing rollers.

When the device according to the invention is a calendar comprising a set of upper rollers and a set of lower rollers, each of these sets is advantageously mounted on a flexible beam.

In a variant, the device according to the invention comprises a set of lower pressing rollers, mounted on a flexible beam, and as upper pressing means a flexible cylindrical pressing roller extending over the entire useful width of the device, the desired curvature of the pressing roller being provided by the supporting action of at least one series of upper rollers, as described for example in European patent publication 0,015,209. In this variant, the upper rollers are also mounted on a flexible beam.

This device is used advantageously for the production of asymmetrical glazings formed from a flexible sheet and a rigid support, the cylindrical pressing roller pressing the flexible plastic sheet on the rigid support.

In another variant, the pressing device according to the invention comprises as upper pressing means a set of upper pressing rollers, mounted according to the invention, on a flexible beam, and a form support suited to the geometry of the glazing as lower pressing means, this support being able to swing around one or more horizontal axes. A pressing device using a form support is described in European patent publication 0,316,224. This device can also be equipped with a flexible cylindrical pressing roller when it is used for assembly of asymmetrical glazings. In this case, the upper rollers, which rest on the flexible roller to give it the desired curvature, are mounted on the flexible beam.

Mounting of the pressing rollers on the flexible beam is achieved by elastic means such as springs or pneumatic means such as cylinders, in particular diaphragm cylinders.

According to the characteristic of the device according to the invention, the set of upper pressing rollers and the set of lower pressing rollers, both mounted on flexible beams, are part of a mobile unit which is mounted on means making it pivot around the pressing line and, optionally, permitting it to move vertically. A mobile unit mounted to pivot and slide vertically is described, for example, in European patent publication 0,290,344.

The curvature of the flexible beam can be more or less pronounced depending on the crosswise profile of the glazing. This curvature can exhibit a symmetry or not.

To obtain the desired curvature in the flexible beam, the device can use one or more adjustment means, connected to a horizontal crossplace as described above, these means being placed at suitable locations on said crosspiece and that for the upper and/or lower pressing rollers.

Thus the device can be equipped with several adjustment means such as threaded rods or cylinders able to act on the same flexible beam, separately or simultaneously. With these means placed at suitable locations, it is possible to obtain a symmetrical curvature, i.e., centered, or not symmetrical, i.e., off-center, or also a more complex curvature depending on the flexibility of the beam and the number of adjustment means used.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic view in elevation of an embodiment of a device comprising a set of upper pressing rollers and a set of lower pressing rollers, each of these sets being mounted on a flexible beam. This device can be used for assembly by pressing of laminated glazings whose two outside faces are formed by rigid sheets, such as glass sheets;

FIG. 2 is a top detail view of the mounting of the ends of the flexible beams on the pivoting frame of the device of FIG. 1;

FIG. 3 is a detail view of mounting of a pressing roller on the flexible beam;

FIG. 4 is a schematic view in elevation of a variant of the device shown in FIG. 1;

DESCRIPTION OF THE PREFERRED EMBODIMENTS

Figure 5:
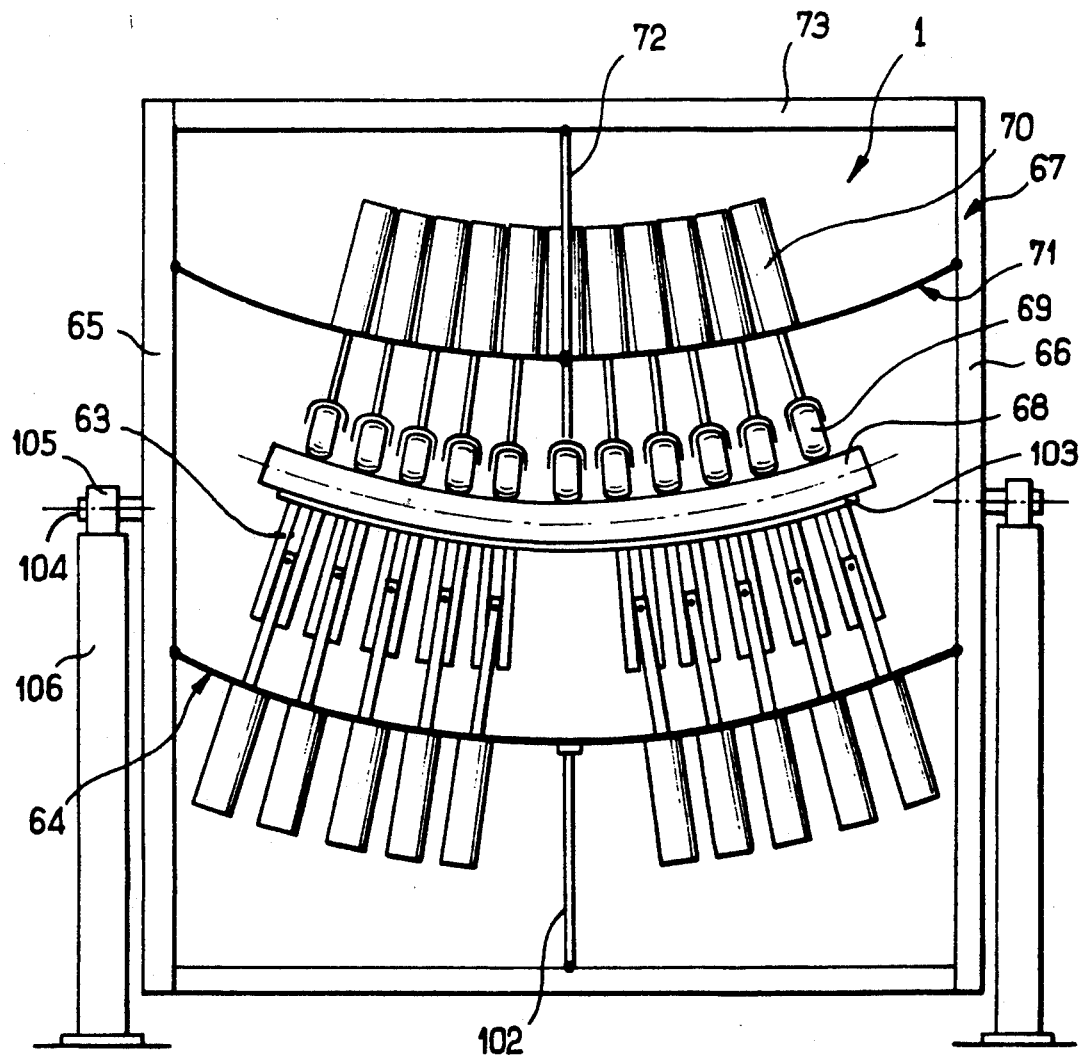
FIG. 5 is a schematic view in elevation of an embodiment of a device comprising a lower set of pressing means mounted on a flexible beam, and a flexible upper pressing roller held by upper rollers which are mounted on a flexible beam.

The device shown in FIG. 1 comprises a mobile unit 1 equipped with a set 2 of upper pressing rollers 3 and a set 4 of lower pressing rollers 5 (not all the rollers are shown). The rollers 3, 5 are mounted in pairs at the end of rods 6 forming a part of an adjustment set (elastic means) 7 making it possible to adjust the positioning of rollers 3, 5 according to the curvature desired for the pressing line for glazing 8 to be pressed. The upper rollers 3 and lower rollers 5 are applied onto the glazing by pneumatic systems (not shown) described, for example, in European patent publication 0,189,345 and forming a part of adjustment sets 7. Upper rollers 3 and their adjustment sets 7 are mounted on a flexible beam 9 formed by two spring blades 10, 11. Spring blades 10, 11 are mounted, as described below, on pins 12, 13 carried by supports 14, 15 on two standards 16, 17 of a frame 18 of a mobile unit 1. Flexible beam 9 formed by two blades 10, 11 is held, via a threaded rod system 19, by a horizontal crosspiece 20 connecting the two standards 16, 17 to form frame 18. This threaded rod system is connected via a transmission with gears 21, 22 and chain 23 to a crank 24 or a motor for the adjustment of the curvature of flexible beam 9.

Lower rollers 5 and their adjustment sets 7 are mounted in the same way on a flexible beam 25, formed by two spring blades 26, 27, mounted on pins 28, 29, carried by supports 30, 31 on the two standards 16, 17 of frame 18 of mobile unit 1. Flexible beam 25 is held, via a threaded rod system 32, by a horizontal crosspiece 33 connecting the two standards 16, 17 to form frame 18. This threaded rod system is connected via a transmission with gears 34, 35 and chain 36 to a crank 37 or a motor for the adjustment of the curvature of lower flexible beam 25.

Set 4 of lower pressing rollers comprises at least two driving rollers connected via a transmission system to an electric motor (not shown) which is preferably placed on the mobile frame at a desired location such that it participates in the balancing of the mobile unit.

Frame 18 and mobile unit 1 are mounted to pivot around two aligned horizontal shafts 38 and 39. Each of the shafts 38 and 39 is fitted at one side in one of the two standards 16, 17 and carried at the other side by bearings (not shown) of frame 40 of the device. In a non-illustrated embodiment of the device, it is possible to provide a movable mounting of horizontal shafts 38, 39 making possible an up-and-down movement of mobile frame 18 on the frame 40.

The above device makes possible the assembly of flat or bent laminated glazings. The bent glazings can have a bend in the crosswise direction which is pronounced, symmetrically or not, relative to the median longitudinal axis of the glazing. To go from one type of glazing to another, e.g. to go from pressing a glazing having a certain crosswise bending to pressing another glazing having a very different crosswise bending, it suffices to operate the threaded rod systems to modify the curvature of the flexible beams, i.e., the spring blades, without modifying the arrangement of adjustment sets 7 relative to one another, or relative to the spring blades on which they are mounted.

In FIG. 2 there is shown the mounting of spring blades 10, 11 of upper flexible beam 9 on pivoting frame 18. Spring blades 10, 11, whose dimensions are, for example, 5 cm in width and 1 cm in thickness, have curved ends which surround shafts 12, 13. One of the pins 12 is stationary and the other 13 slides on its support so as to move crosswise according to the curvature which is imposed on the blades.

The two spring blades 10, 11 are placed parallel and are separated from one another by a space making possible the mounting therethrough of the adjustment sets 7 of the upper pressing rollers.

Stationary pin 12 is mounted on two bearings 41, 42 integral with a support 14 connected to standard 16 of pivoting frame 18. Sliding pin 13 is mounted in two housings 43, 44, e.g., rollers, allowing a crosswise displacement according to the variation of the curvature of the two blades. Housings 43, 44, like the bearings described above, are mounted on a support 15 connected to the other standard 17 of the pivoting frame.

The mounting of the two spring blades 26, 27 constituting flexible beam 25 carrying lower pressing rollers 5 is identical with that of the mounting described above for the two blades 10, 11 constituting upper flexible beam 9.

In FIG. 3 is shown an example of the mounting of a pair of the lower pressing rollers 5 on flexible beam 25 formed by two blades 26, 27. Rollers 5 are mounted in pairs in rotation around a pin 45 mounted in a trunnion piece 46, which is mounted in a fork 47. Fork 47 is mounted at the upper end of rod 48 of a cylinder formed with a piston 49 which can be vertically displaced inside a pneumatic cylinder 50 formed by two parts 51, 52 attached to one another by a flange assembly 53. Between the two flanges is squeezed an elastic diaphragm 54. The pneumatic pressure introduced via pressure duct 55 into pneumatic cylinder 50 acts on diaphragm 54 which transits the pressure to piston 49. Pressure cylinder 51 is fastened to the two spring blades 26, 27 constituting flexible beam 25. Between flexible beam 25 and fork 47, a spring 56 is provided around rod 48 of piston 49. The function of this spring 56 is to compensate for the weight of the mobile unit of lower and upper pressing rollers. After the passage of the glass sheet between the pairs of rollers, the rollers thus remain in the position corresponding to the position of the passage of the sheet and do not sink into a lower end position under the effect of their own weight.

The mounting of upper rollers 3 is similar to the mounting described above for lower rollers 5. However, it is not necessary to place a spring around the rods of the cylinders moving the upper rollers in the same way as for the cylinders moving the lower rollers. The pressure cylinders of the lower rollers and the upper rollers which are opposite them are in communication so that pressure exerted on the two faces of the glazing to be calendared by the rollers is equal.

In FIG. 4 is shown a variant of the device described in relation to FIG. 1. In this variant, the two flexible beams 9, 25, again each constituted by two parallel spring blades, are connected to crosspieces 20, 33 belonging to pivoting mobile frame 18 by fastening systems adjustable in length. Here there are three threaded rods or cylinders 57, 58, 59 for the upper flexible beam and three other fastening systems 60, 61, 62 for the lower flexible beam. The connections between the fastening systems and flexible beams, on the one hand, and the horizontal crosspieces, on the other hand, may be jointed. The adjustment fastening system can be connected or disconnected in pairs depending on the crosswise profile (or curvature) desired. It is possible, for example, to use only fastening systems 58 and 61 for a symmetrical curvature or only fastening systems 57 and 60 or 59 and 62 for an off-center nonsymmetrical curvature. It is also possible to use four or six such systems in combination, for example, to have a more complex curvature.

It is also possible to modify the position of mounting points 101 of the flexible beams on lateral standards 16, 17. This modification can be automated.

The devices shown in FIGS. 1 and 4 can be controlled by a computer 200 having in memory the shape of the glazings to be assembled. The computer controls the position of the pressing rollers by acting on the fastening systems to modify the curvature of the flexible beams. Before introducing a glazing into the pressing line, it is curved into a curvature corresponding to the original position of the rollers. Then, as the glazing advances between the rollers, this curvature can be modified as a function of the variation of the curvature of the glazing to be assembled.

The device shown in FIG. 5 has a lower set of pressing rollers 63 carried by a flexible beam 64 also formed by two spring blades whose ends are mounted around shafts on the two standards 65, 66 of pivoting frame 67 of mobile unit 1. The flexible beam 64 is supported by an adjustable fastening system 102, for example a system of threaded rods or a cylinder. The upper pressing means here include a flexible pressing roller 68 extending over the entire useful width of the device the roller being curved under the action of upper rollers 69 which are mounted by their mounting units 70 on a flexible beam 71 connected, via an adjustable fastening system 72, to upper crosspiece 73 which is part of mobile frame 67. Support rollers (not shown) can be applied upstream and downstream from pressing roller 68 and prevent it from escaping the action of the upper pressing rollers. Frame 67 pivots around two pins 104, carried by bearings 105, mounted on frame 106.

This device can be used for assembly by calendaring of a glazing 103 formed by a rigid support and a flexible plastic sheet. In this case, the flexible pressing roller presses on the plastic sheet, and the lower rollers press on the lower face of the rigid support.

Figure 6:
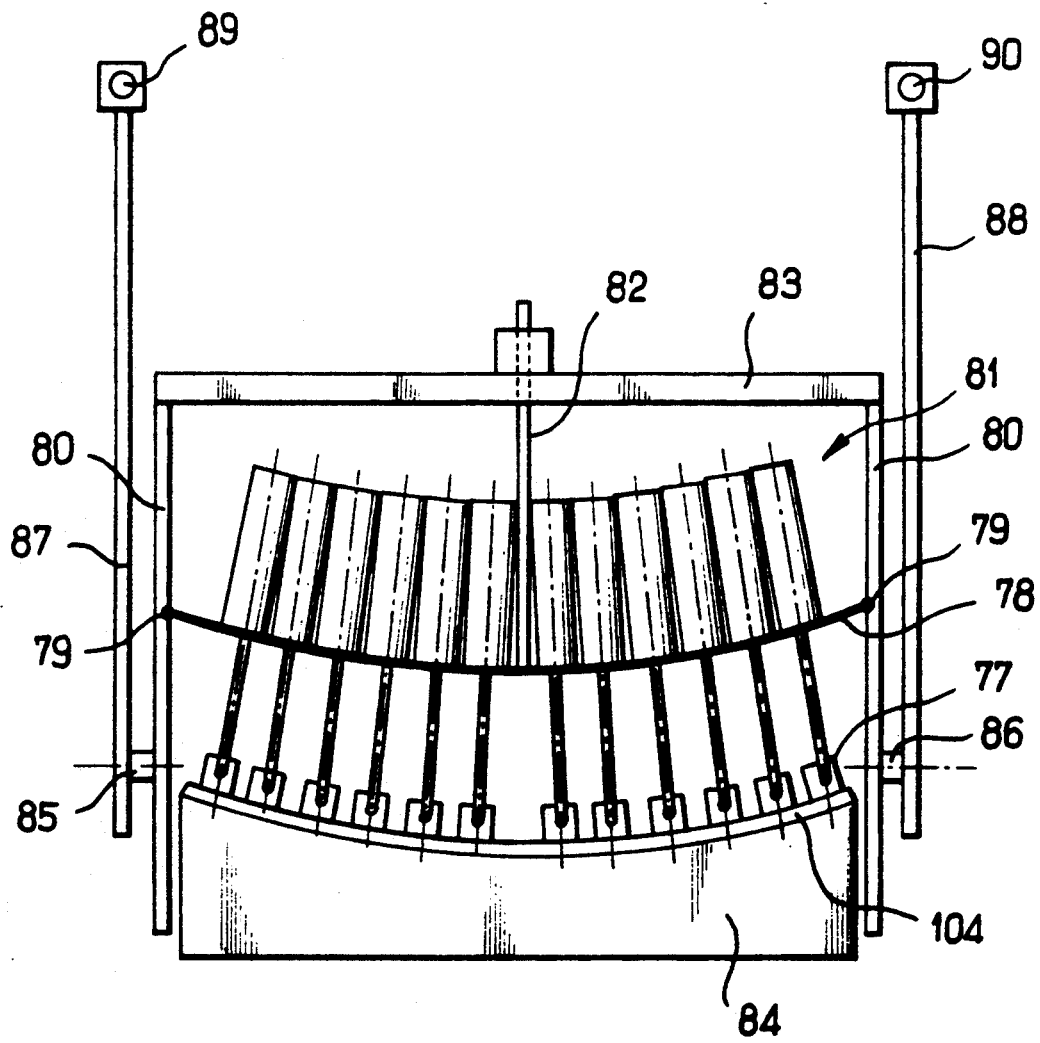
FIG. 6 is a schematic view in elevation of an embodiment of a device comprising an upper set of pressing means mounted on a flexible beam, and a form support as lower pressing means.

The device shown in FIG. 6 comprises a set of upper pressing rollers 77 mounted on a flexible beam 78, formed by two spring blades mounted around horizontal pins 79 carried by standards 80 of a mobile unit 81 and supported by an adjustable fastening system 82 to an upper crosspiece 83 connecting the two vertical standards 80. The lower part of the device is formed by a support 84 which takes the shape of glazing 104 to be assembled. The two vertical standards 80 can pivot around two horizontal pins 85, 86 carried by two arms 87, 88 mounted to slide along two horizontal rails 89, 90 extending perpendicular to flexible beam 78 carrying the set of upper pressing rollers 77.

In a variant of this device, it is possible to replace the set of upper pressing rollers with a pressing set comprising a flexible pressing roller curved under the pressure of upper rollers, such as the one shown in FIG. 5. In this case, the upper rollers are mounted on a flexible beam.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for assembly by pressing of a laminated glazing, comprising:
   a frame having two vertical uprights;
   a flexible beam comprising at least one spring blade and connected between said vertical uprights;
   at least one set of pressing rollers extending crosswise to a glazing to be pressed;
   elastic means extending between said flexible beam and said pressing rollers such that said at least one set of said rollers is mounted to said flexible beam via said elastic means, and
   adjustment means being connected between said frame and said flexible beam for adjusting the curvature of the beam,
   whereby the pressing rollers can be caused to assume a desired curved profile by curving the beam to the desired profile.

2. The device of claim 1, wherein said flexible beam comprises two parallel spring blades, including said elastic means extending between the spring blades.

3. The device of claim 2, wherein said at least one set of pressing rollers comprises two sets of pressing rollers, said two sets having mutually opposing rollers.

4. The device of claim 3, wherein one of said at least one set of rollers is an upper set of rollers, further including a flexible roller pressed by the upper rollers.

5. The device of claim 3, wherein one of said at least one set of rollers is a lower set of rollers, including spring means on said lower set of rollers for compensating for the weight of the pressing rollers.

6. The device of claim 2, wherein said at least one set of rollers is an upper set of rollers, further including a form support positioned in opposition to said rollers for supporting the glazing from below.

7. The device of claim 2, wherein said elastic means comprise pneumatic elements.

8. The device of claim 7, wherein said pneumatic elements comprise diaphragm cylinders, all of the diaphragm cylinders being in fluid communication with one another.

9. The device of claim 1, wherein said adjustment means comprise a threaded rod.

10. The device of claim 1, wherein said adjustment means comprise a fluid cylinder.

11. The device of claim 1, wherein said flexible beam has one end fixed to said frame and another end slidably mounted to said frame.

12. The device of claim 1, including control means for automatically operating said adjustment means.

13. The device of claim 1, wherein said adjustment means comprises a plurality of adjustment elements spaced along the length of the flexible beam.

14. The device of claim 1, wherein at least some of the rollers are driven.

15. A device for assembly by pressing of a laminated glazing, comprising:
   a frame having two vertical uprights;
   at least one spring blade forming a flexible beam connected between said vertical uprights;
   at least one set of pressing rollers extending crosswise to a glazing to be pressed, said at least one set of rollers being mounted to said flexible beam; and
   adjustment means being connected between said frame and said flexible beam for adjusting the curvature of the beam,
   whereby the pressing rollers can be caused to assume a desired profile by curving the beam to the desired profile.

* * * * *